March 29, 1960     W. R. FREEMAN     2,930,901
STARTING CIRCUIT
Filed Dec. 4, 1958
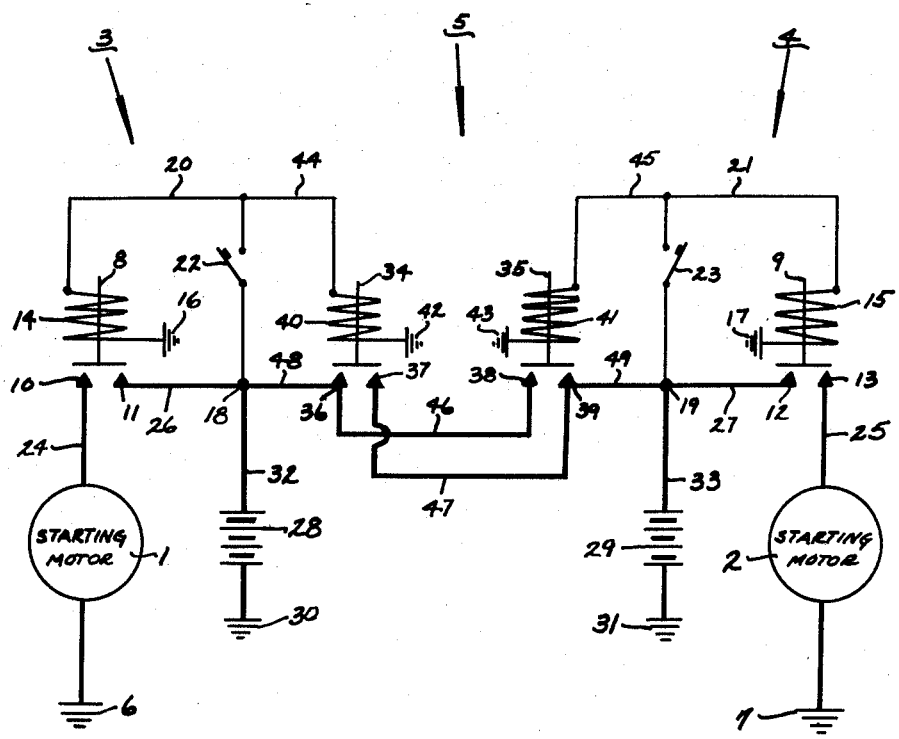
INVENTOR:
WALTER R. FREEMAN
BY *Joseph E. Papin*
AGENT — # United States Patent Office 2,930,901
Patented Mar. 29, 1960

2,930,901

STARTING CIRCUIT

Walter R. Freeman, Portage Des Sioux, Mo.

Application December 4, 1958, Serial No. 778,167

7 Claims. (Cl. 290—38)

This invention relates to starting circuits and in particular to those for selectively connecting power sources of a plurality of ignition fired, internal combustion engine installations.

In the past, each internal combustion engine installation was provided with a starting motor which was energized when serially connected with a battery by a starting motor solenoid, said energization being controlled by a manual switch between said solenoid and battery. When more than one internal combustion engine installation was provided, such as in a marine or industrial installation, for example, the starting motor of each of said installations was energized by its own individual battery, as above-described.

An object of the present invention is to provide an interconnecting circuit in combination with the starting motor circuits of individual internal combustion engine installations whereby each of the individual batteries therein are parallel to energize a starting motor in one of said starting motor circuits.

Another object of the present invention is to provide a starting circuit arrangement for a plurality of internal combustion engine installations which provides additional power during an engine starting operation.

Another object of the present invention is to provide a starting circuit arrangement for an internal combustion engine installation having a battery therein connected to be augmented by another battery during an engine starting operation.

Still another object of the present invention is to provide a starting circuit arrangement for a plurality of internal combustion engine installations which reduces the voltage drop during an engine starting operation.

These and other objects and advantages will become apparent hereinafter.

The invention also consists in the parts and the combination and arrangement of parts hereinafter described and claimed. In the accompanying drawing which forms a part of this specification and wherein like numerals refer to like parts wherever they occur, the single figure is a schematic wiring diagram of a starting circuit illustrating the preferred embodiment of the present invention.

Briefly, the invention embodies a starting circuit which connects a battery for a starting motor in an internal combustion engine installation in parallel with another battery during the starting operation thereof. Another aspect of the invention embodies a starting circuit which connects a battery for each starting motor in a plurality of internal combustion engine installations in parallel during the starting operation of one of said installations.

Referring now to the drawing, each starting motor 1 and 2 for individual, ignition fired, internal combustion engine installations, or the like (not shown), is provided with individual starting or starting motor circuits, indicated generally at 3 and 4, respectively; and, said starting motor circuits are interconnected for parallel starting operation by an interconnecting circuit, indicated generally at 5.

In the starting motor circuits 3 and 4, the starting motors 1 and 2 are grounded at 6 and 7 and are provided with starting solenoids or relay switches 8 and 9, respectively. The solenoids 8 and 9 are each provided with a pair of contacts 10, 11 and 12, 13 along with exciting coils 14 and 15, respectively. One of the ends of exciting coils 14 and 15 is grounded at 16 and 17, respectively, while the other of the ends thereof is connected to junctions 18 and 19, respectively, by leads 20 and 21, said leads 20 and 21 having normally open operator or ignition switches 22 and 23 therein. The starting motors 1 and 2 are connected to solenoid contacts 10 and 13, respectively, by leads 24 and 25, and the solenoid contacts 11 and 12 are connected to junctions 18 and 19, respectively, by leads 26 and 27. To complete the starting motor circuits 3 and 4, batteries 28 and 29 are grounded at 30 and 31 and are connected to junctions 18 and 19, respectively, by leads 32 and 33.

In the interconnecting circuit 5 which connects the individual starting motor circuits 3 and 4, as mentioned hereinbefore, solenoids or relay switches 34 and 35 are each provided with a pair of contacts 36, 37 and 38, 39 along with exciting coils 40 and 41, respectively. One of the ends of exciting coils 40 and 41 is grounded at 42 and 43, respectively, and leads 44 and 45 connect the other of the ends thereof with the leads 20 and 21, respectively, of starting circuits 3 and 4 between switches 22 and 23 and solenoid exciting coils 14 and 15. The contacts 36 and 38 of solenoids 34 and 35, respectively, are connected by a lead 46, and the other contacts 37 and 39 thereof are connected by a lead 47. To complete the interconnecting circuit 5, a lead 48 is interposed between the solenoid contact 36 and the junction 18 of the starting motor circuit 3, and another lead 49 is interposed between the solenoid contact 39 and the junction 19 of the starting motor circuit 4.

The component parts of starting motor circuits 3 and 4 and the interconnecting circuit 5 normally obviate current flow to starting motors 1 and 2 during all the operational phases inherent to ignition fired, internal combustion engine installations, or the like (not shown), with the exception of the starting operation which is described hereinafter.

In the starting operation when the operator desires to energize the starting motor 1, the switch 22 is closed allowing current flow from the battery 28 to energize the exciting coil 14 of the solenoid 8 through leads 32 and 20 and to simultaneously energize the exciting coil 40 of the solenoid 34 through the lead 44. Upon energization of solenoids 8 and 34, a circuit is completed across the respective contacts 10, 11 and 36, 37 thereof connecting batteries 28 and 29 in parallel to energize the starting motor 1. Current flows from the battery 29 to the starting motor 1 via leads 33, 49, and 47, closed solenoid contacts 37 and 36, leads 48 and 26, closed solenoid contacts 10 and 11, and the lead 24. Current also flows from the battery 28 to the starting motor 1 via leads 32 and 26, closed solenoid contacts 10 and 11, and the lead 24. In this manner, batteries 28 and 29 are connected in parallel and augment each other to energize the starting motor 1 thereby providing additional power during the starting operation.

When the internal combustion engine installations, or the like, driven by the starting motor 1 is started, the switch 22 is opened to simultaneously de-energize exciting coils 14 and 40 of solenoids 8 and 34, respectively. Upon de-energization, the solenoids 8 and 34 open the circuit across the respective contacts 10, 11 and 36, 37 thereof to interrupt the above-described parallel circuit arrangement between batteries 28 and 29 and the starting motor 1 and to obviate current flow therebetween.

If the operator desires to energize the starting motor 2, the switch 23 is closed allowing current flow from the battery 29 to energize the exciting coil 15 of the solenoid 9 through leads 33 and 21 and to simultaneously energize the exciting coil 41 of the solenoid 35 through the lead 45. Upon energization of solenoids 9 and 35, a circuit is closed across the contacts 12, 13 and 38, 39, respectively, thereof connecting batteries 28 and 29 in parallel to energize the starting motor 2. Current flows from the battery 28 to the starting motor 2 via leads 32, 48, and 46, closed solenoid contacts 38 and 39, leads 49 and 27, closed solenoid contacts 12 and 13, and the lead 25. Current also flows from the battery 29 to the starting motor 2 via leads 33 and 27, closed solenoid contacts 12 and 13, and the lead 25. In this manner, the batteries 28 and 29 are connected in parallel and augment each other to energize the starting motor 2 thereby providing additional power during the starting operation.

When the internal combustion engine installation, or the like, driven by the starting motor 2 is started, the switch 23 is opened to simultaneously de-energize exciting coils 15 and 41 of solenoids 9 and 35, respectively. Upon de-energization, the solenoids 9 and 35 open the circuit across the contacts 12, 13 and 38, 39, respectively, thereof to interrupt the above-described parallel circuit arrangement between the batteries 28 and 29 and the starting motor 2 and to obviate current flow therebetween.

If the operator desires to simultaneously energize starting motors 1 and 2, switches 22 and 23 are closed simultaneously which, in turn, effects the simultaneous energization of solenoids 8 and 9 in starting motor circuits 3 and 4, respectively, and solenoids 34 and 35 in the interconnecting circuit 5, as previously described. Since solenoids 8, 9, 34 and 35 are energized, a circuit is now completed across the respective contacts 10, 11; 12, 13; 36, 37; and 38, 39 thereof connecting batteries 28 and 29 in parallel and effecting current flow, as previously described, to energize both starting motors 1 and 2. In this manner, batteries 28 and 29 are connected in parallel and augment each other during simultaneous starting operations of starting motors 1 and 2.

When the internal combustion engine installations, or the like, driven by starting motors 1 and 2 are started, switches 22 and 23 are opened simultaneously to de-energize solenoids 8, 9, 34 and 35, as previously described, opening the circuit across the respective contacts 10, 11; 12, 13; 36, 37; and 38, 39 thereof to interrupt the parallel circuit arrangement between batteries 28 and 29 and starting motors 1 and 2 and to obviate current flow therebetween.

From the foregoing, it is obvious an interconnecting circuit 5 is provided in combination with the starting motor circuits 3 and 4 of individual internal combustion engine installations whereby each of the individual batteries 28 and 29 therein are paralleled to energize a starting motor in one of said starting circuits. When the switch 22 is closed, the solenoid 8 of the starting circuit 3 is energized to serially connect the starting motor 1 and battery 28; and, simultaneously therewith, the solenoid 34 of the interconnecting circuit 5 is also energized to place the battery 29 of the starting motor circuit 4 in parallel with the battery 28 of the starting motor circuit 3. When the switch 23 is closed, the solenoid 9 of the starting motor circuit 4 is energized to serially connect the starting motor 2 and battery 29; and, simultaneously therewith, the solenoid 35 of the interconnecting circuit 5 is also energized to place the battery 28 of the starting motor circuit 3 in parallel with the battery 29 of the starting motor circuit 4.

It is obvious that a starting circuit arrangement is provided for a plurality of internal combustion engine installations which provides additional power during the starting operation of one of said installations. When one of the solenoids 34 and 35 of the interconnecting circuit 5 is energized to place the batteries 28 and 29 in parallel circuit arrangement, said batteries provide additional power to energize one of the starting motors 1 and 2.

It is also apparent that a starting circuit arrangement for an internal combustion engine installation is provided having a battery therein connected to be augmented by another battery during a starting operation. When the solenoid 8 in the starting motor circuit 3 is energized to serially connect the starting motor 1 and battery 28 therein, the solenoid 34 is simultaneously energized to place the battery 29 in parallel circuit relationship with the battery 28. In this manner, the batteries 28 and 29 are connected in parallel to energize the starting motor 1 whereby one of said batteries augments the other.

Further, it is apparent that a starting circuit for a plurality of internal combustion engine installations is provided which reduces the voltage drop during a starting operation of one of said installations. When the batteries 28 and 29 are connected in parallel circuit arrangement as one of the starting motors 1 and 2 is energized, said batteries augment each other and provide additional power thereby reducing the voltage drop in the starting circuit of the starting motor being energized.

It is now apparent that there has been provided a starting circuit for a plurality of internal combustion engine installations which fulfills all of the objects and advantages sought therefor.

The foregoing description and accompanying drawing has been presented only by way of illustration and example, and changes and alterations in the instant disclosure, which will be apparent to one skilled in the art, are contemplated as within the scope of the instant invention which is limited only by the claims which follow.

What I claim is:

1. A starting circuit for an engine installation comprising a starting motor circuit having a starting motor, a first battery, a first relay switch connected in circuit between said starting motor and first battery to energize said starting motor, a second battery, a second relay switch circuit means connecting said second battery in parallel with said first battery through said second relay switch, a relay switch operating circuit including switching means for actuating said first and second relay switches, a load circuit, a third relay switch connected between said second battery and said load circuit, a fourth relay switch connected in circuit between said first and second batteries for connecting the first and second batteries in parallel circuit relationship independently of the energization of said starting motor, and a second relay switch operating circuit for actuating said third and fourth relays.

2. A starting circuit for an engine installation comprising a starting motor and a first battery, a first normally open relay switch having one contact connected with the starting motor and the other contact thereof connected with the first battery, a second battery, a second normally open relay switch having one contact connected with said first battery and the other contact thereof connected with said second battery, a first relay switch operating circuit including switching means for closing said first and second relay switches to connect said batteries in parallel and energize said starting motor, a load circuit, a third normally open relay switch having one contact connected with said second battery and the other contact thereof connected with the load circuit, a fourth normally open relay switch having one contact connected with said first battery and the other contact thereof connected with said other contact of said second relay switch, and a second relay switch operating circuit including switching means for closing said third and fourth relay switches to connect said batteries in parallel and to energize said load circuit.

3. A starting circuit for engine installations having separate starting motor circuits, each comprising a starting motor, a battery, a normally open relay switch connected in circuit between said starting motor and battery, means for closing said relay switch to energize said starting motor, and a circuit for interconnecting said starting motor circuits including an interconnecting relay switch responsive to closing of the relay switch of one of said starting motor circuits for connecting the battery therein in parallel circuit relationship with the battery of another of said starting motor circiuts.

4. A starting circuit for engine installations having separate starting motor circuits, each comprising a starting motor, a battery, a normally open relay switch connected in circuit between said starting motor and battery, means for closing said relay switch to energize said starting motor, and a circuit for interconnecting said starting motor circuits including a first interconnecting relay switch responsive to closing of the relay switch of one of said starting motor circuits for connecting the battery therein in parallel circuit relationship with the battery of the other of said starting motor circuits independent of the starting motor therein, and a second interconnecting relay switch responsive to closing of the relay switch in said other of said starting motor circuits for connecting the battery therein in parallel circuit relationship with the battery of said one of said starting motor circuits independently of the starting motor therein.

5. A starting circuit for engine installations comprising a first starting motor circuit having a first starting motor, a first battery, a first normally open relay switch connected in circuit between said first starting motor and first battery, a first relay switch operating circuit including a normally open switch therein operable to close said first relay switch and energize said first starting motor, a second starting motor circuit separate from said first starting motor circuit and having a second starting motor, a second battery, a second normally open relay switch connected in circuit between said second starting motor and second battery, a second relay switch operating circuit including a second normally open switch therein operable to close said second relay switch and energize said second starting motor, and a circuit for interconnecting said first and second starting motor circuits including a third relay switch responsive to closing of said first relay switch for connecting said first battery in parallel circuit relationship with said second battery independently of said second starting motor, and a fourth relay switch responsive to closing of said second relay switch for connecting said second battery in parallel circuit relationship with said first battery independently of said first starting motor.

6. A starting circuit for engine installations comprising a first starting motor circuit having a first starting motor, a first battery, a first normally open solenoid switch having one contact connected with said first starting motor and the other contact thereof connected with said first battery, a first solenoid switch operating circuit including a first normally open manual switch connected in circuit between the exciting coil of said first solenoid switch and said first battery and operable to close said first solenoid switch, a second starting motor circuit separate from said first starting motor circuit and having a second starting motor, a second battery, a second normally open solenoid switch having one contact connected with said second starting motor and the other contact thereof connected with said second battery, a second solenoid switch operating circuit including a second normally open manual switch connected in circuit between the exciting coil of said second solenoid switch and said second battery and operable to close said second solenoid switch, and an interconnecting circuit for said first and second starting motor circuits including third and fourth normally open solenoid switches each having one contact connected in circuit with said first battery and the other contact thereof connected in circuit with said second battery, the exciting coils of said third and fourth solenoids being connected in circuit with the exciting coils of said first and second solenoid switches in said first and second solenoid switch operating circuits, respectively, whereby said third solenoid switch is responsive to closing of said first solenoid switch to connect said first and second batteries in parallel circuit relationship with said first starting motor independently of said second starting motor and said fourth solenoid switch is responsive to closing of said second solenoid switch to connect said first and second batteries in parallel circuit relationship with said second starting motor independently of said first starting motor.

7. A starting circuit for engine installations as recited in claim 6 wherein said third and fourth solenoid switches are responsive to closing of said first and second solenoid switches, respectively, to connect said first and second batteries in parallel circuit relationship with both said first and second starting motors.

References Cited in the file of this patent

UNITED STATES PATENTS

| | | |
|---|---|---|
| 1,362,380 | Woolson | Dec. 14, 1920 |
| 1,476,686 | Brotz | Dec. 11, 1923 |
| 2,616,054 | Rady | Oct. 28, 1952 |
| 2,629,059 | Baumheckel | Feb. 17, 1953 |
| 2,692,953 | Markett | Oct. 26, 1954 |
| 2,729,750 | Draper et al. | Jan. 3, 1956 |
| 2,730,630 | Bruno | Jan. 10, 1956 |